3,153,615
METHODS OF REDUCING PLASMA CHOLESTEROL

David K. Bosshardt, Berkeley Heights, Eugene E. Howe, Somerset, and Jesse W. Huff, Westfield, N.J., assignors to Merck & Co., Inc., Rahway, N.J., a corporation of New Jersey
No Drawing. Filed Nov. 6, 1962, Ser. No. 235,836
11 Claims. (Cl. 167—65)

This invention relates to methods of reducing the cholesterol content of mammalian plasma. More particularly, it relates to methods of lowering the cholesterol content of mammalian plasma by incorporating lithocholic acid or hyodeoxycholic acid in the diet. More specifically, this invention relates to methods of lowering the cholesterol content of mammalian plasma which comprises incorporating in the diet one of the following: (1) from 0.05 to 1.0 percent of lithocholic acid, based on the weight of said diet, (2) from 0.05 to 1.0 percent of lithocholic acid, based on the weight of said diet, and at least sufficient of a thyroid-active substance to be equivalent in activity to 0.01 mg. of thyroxine per kilogram of body weight per day, or at least 0.5 mg. per kilogram of body weight of an in vivo cholesterol synthesis inhibitor, or (3) from 0.05 to 1.0 percent of hyodeoxycholic acid, based on the weight of said diet, and at least sufficient of a thyroid-active substance to be equivalent in activity to 0.01 mg. of thyroxine per kilogram of body weight per day, or at least 0.5 mg. per kilogram of body weight of an in vivo cholesterol synthesis inhibitor.

This application is a continuation-in-part of copending patent applications Serial No. 135,119 and Serial No. 135,120, both filed August 31, 1961, both now abandoned.

Heart disease has been the leading cause of death in the United States in recent years. Atherosclerosis is one of the most significant forms of cardiovascular disease because of its frequent occurrence and its predilection for serious ailments such as coronary thrombosis. Atherosclerosis is characterized by intimal thickening, and the reduction in diameter and loss of elasticity of arteries due to fatty accumulations. Higher blood levels of cholesterol are observed in atherosclerosis patients than in normal persons. Accordingly, it is considered important in the treatment and prevention of atherosclerosis to maintain normal blood cholesterol levels.

The common atherosclerosis therapy up to the present time has been a low fat diet, devoid as far as possible of animal fats. This necessitates reduced consumption of nutritious foods such as meat, milk and eggs. It is evident that a more desirable therapy would be to permit the patient to have a normal diet and to maintain the cholesterol blood level where desired by control with a therapeutic agent.

It has been found that large amounts of cholic acid in the enterohepatic circulation causes an increase in the amount of cholesterol which is to be found in the body plasma. We have now found that lithocholic acid counteracts this hypercholesteremic action of endogenous cholic acid in mammalian substances. This counteraction results in a lowering of the cholesterol to be found in the body plasma such as the blood. Further, we have found that, when lithocholic acid is used in conjunction with either thyroid-active substances or with substances inhibiting the in vivo synthesis of cholesterol, one obtains a reduction of plasma cholesterol which is greater than the sum of the reduction obtainable with either substance by itself. Both thyroid-active substances and substances which inhibit the in vivo synthesis of cholesterol are known to reduce plasma cholesterol, but the result when either is used in admixture with lithocholic acid is greater than the sum of the results from each. This is a mutual therapeutic potentiation.

We have also found that hyodeoxycholic acid will counteract this hypercholesteremic action of endogenous cholic acid in mammalian substances when used in conjunction with either a thyroid-active substance or an inhibitor of in vivo cholesterol synthesis. This counteraction similarly results in a lowering of the cholesterol to be found in the body plasma, which is much more than that observed with either the thyroid-active substances or the cholesterol synthesis inhibitors, both of which classes are known to lower blood cholesterol. Since hyodeoxycholic acid, by itself, has no effect on the hypercholesteremic action of endogenous cholic acid, the enhanced lowering of plasma cholesterol when hyodeoxycholic acid is included in a diet along with these substances is a true potentiation.

According to this invention, there is included in the diet of the mammal at least 0.05%, based on the weight of said diet, of lithocholic acid, or hyodeoxycholic acid. A maximum effect is obtained at approximately 0.4% usage and further increase in the usage does not further lower blood cholesterol. Above 0.5% there is a tendency toward loss of weight which makes use of larger amounts undesirable.

It is quite remarkable that lithocholic acid has an effect by itself in counteracting the production of endogenous cholic acid. Many related compounds have been observed to oppose the action of exogenous cholic acid, i.e., that which is added to the diet, but only lithocholic acid prevents the formation of endogenous cholic acid, i.e., that which is naturally present in the body.

Even more remarkable is the potentiation effect of lithocholic acid and hyodeoxycholic acid on other substances commonly used to lower blood cholesterol. This potentiation makes the use of lithocholic acid and hyodeoxycholic acid in conjunction with these other materials an important method of reducing plasma cholesterol. One type of such material which is commonly used to lower plasma cholesterol is the class of substances which are active on the thyroid glands. Examples of these are iodinated casein (e.g., Protamone [1]), thyroxine (an active hormone of the thyroid gland), as well as extracts of thyroid glands.

Another type of substance which is used to lower plasma cholesterol and which is also potentiated by lithocholic acid and hyodeoxycholic acid is the class of compounds which inhibit the in vivo synthesis of cholesterol. Such inhibition usually occurs at the stage of biosynthesis where desmosterol is transformed into cholesterol. Examples of such compounds are well-known in the art and some are available commercially. One of the latter is 1-[p-($\beta$-diethylaminoethoxy)-phenyl]-1-(p-tolyl)-2-(p - chlorophenyl) ethanol (also known as Triparanol). A number of compounds of related structure, having similar activity,

[1] Trademark of Cerophyl Laboratories, Inc., for an iodinated, thyroactive casein containing 6.5% iodine and 1% 1-thyroxine.

have also been described in the literature. In addition to these compounds, a broad class of somewhat different compounds have been found to have this activity and these too are usable in conjunction with lithocholic acid and hyodeoxycholic acid in the methods of this invention. These compounds are exemplified by 2-(β-diethylaminoethoxy)-6-(cyclohexene-1-one-3-yl) - naphthalene. This compound and related compounds having this activity are described in the application of Bolhofer and Sprague, Serial No. 76,996, filed December 20, 1960.

The usage of the potentiated hypocholesteremic agent of either class can be that in which it is used without any potentiating effect. However, because of the potentiation it is also possible to reduce somewhat the usage of these agents. The activity of thyroid-active compositions varies and in order to express the amount to be used in the method of this invention, it is necessary to express it in terms of the equivalent activity to thyroxine. One should use at least enough thyroid-active material to be equivalent to 0.01 mg. of thyroxine per kilogram of body weight per day. The in vivo cholesterol synthesis inhibitors are usually used in doses of 3 or more mg. per kilogram of body weight per day. When used in conjunction with lithocholic acid and hyodeoxycholic acid, the daily diet should include at least 0.5 mg. of said in vivo cholesterol synthesis inhibitors per kilogram of body weight per day.

Other additives will be obvious to those skilled in the art depending on the auxiliary purposes for which such other diet supplements are needed.

Our invention can be illustrated by the following examples:

Example 1

The experimental procedure of Howe and Bosshardt, Journal of Nutrition, 72, p. 368 (1960), is followed.

Male weanling mice are housed individually, 8 per group, and allowed to feed ad libitum. The basal diet consists of casein, glucose, salt mixture, cellulose, and a vitamin addendum is supplemented at the expense of glucose. Various dietary supplements are added as shown in the table of results:

| Dietary Supplement | Plasma Cholesterol (mg. percent) | Weight Gain (Gms.) |
|---|---|---|
| 15% Mixed Fat | 96 | 6.1 |
| 15% Mixed fat + 0.4% Hyodeoxycholic acid | 99 | 4.2 |
| 15% Mixed fat + 0.1% Protamone | 102 | 6.3 |
| 15% Mixed fat + 0.1% Protamone + 0.4% Hyodeoxycholic Acid | 89 | 5.5 |

Example 2

The procedure of Example 1 is followed using different dietary supplements with the following results:

| Dietary Supplement | Plasma Cholesterol (mg. percent) | Weight Gain (Gms.) |
|---|---|---|
| 10% Hydrol* | 105 | 3.7 |
| 10% Hydrol + 0.1% Protamone | 78 | 1.8 |
| 10% Hydrol + 0.1% Protamone + 0.4% Hyodeoxycholic acid | 35 | 1.2 |

*Hydrogenated coconut oil.

Example 3

The procedure of Example 1 is followed using different dietary supplements with the following results:

| Dietary Supplement | Plasma Cholesterol Levels | |
|---|---|---|
| | 15% Mixed Fat Basal Diet (mg. percent) | 2% Cod Liver Oil Basal Diet (mg. prcent) |
| Control | 112 | 87 |
| 50 mg. Triparanol/Kg. diet | 74 | 55 |
| 100 mg. Triparanol/Kg. diet | 66 | 46 |
| 0.1% Hyodeoxycholic acid | 108 | 82 |
| 0.2% Hyodeoxycholic acid | 118 | 84 |
| 0.1% Hyodeoxycholic acid + 50 mg. Triparanol/Kg. diet | 56 | 46 |
| 0.2% Hyodeoxycholic acid + 100 mg. Triparanol/Kg. diet | 54 | 35 |
| 0.2% Hyodeoxycholic acid + 50 mg. Triparanol/Kg. diet | 62 | 35 |
| 0.2% Hyodeoxycholic acid + 100 mg. Triparanol/Kg. diet | 58 | 35 |

Example 4

The procedure of Example 1 is followed using different dietary supplements with the following results:

| Dietary Supplement | Plasma Cholesterol (mg. percent) | Weight Gain (Gms.) |
|---|---|---|
| 15% Mixed fat | 114 | 5.3 |
| 15% Mixed fat + 0.4% lithocholic acid | 105 | 5.4 |
| 15% Mixed fat + 0.1% Protamone (iodinated casein) | 141 | 5.9 |
| 15% Mixed fat + 0.4% lithocholic acid + 0.1% Protamone | 78 | 5.8 |

Example 5

The procedure of Example 1 is followed using different dietary supplements with the following results:

| Dietary Supplement | Plasma Cholesterol (mg. percent) | Weight Gain (Gms.) |
|---|---|---|
| 10% Hydrol (hydrogenated coconut oil) | 120 | 4.7 |
| 10% Hydrol + 0.1% Protamone | 92 | 3.1 |
| 10% Hydrol + 0.1% Protamone + 0.4% lithocholic acid | 54 | 3.7 |

Example 6

The procedure of Example 1 is followed using the following dietary supplements:

| Percent Lithocholic acid | Percent Triparanol | | | |
|---|---|---|---|---|
| | 0 | 0.005 | 0.01 | 0.02 |
| | Mg. Percent Cholesterol | | | |
| 0 | 114 | 63 | 62 | 52 |
| 0.1 | 109 | 60 | 57 | 53 |
| 0.2 | 109 | 54 | 52 | 34 |
| 0.4 | 105 | 59 | 49 | 50 |

NOTE.—Basal semi-purified with 15% mixed fat. Duration of feeding period—12 days.

Example 7

The procedure of Example 1 is followed using varying percentages of lithocholic acid and various fat supplements, with the following results:

| Fat Supplement | Percentage of Lithocholic Acid | | | | | | | | | |
|---|---|---|---|---|---|---|---|---|---|---|
| | 0.0% | | 0.05% | | 0.1% | | 0.2% | | 0.4% | |
| | Plasma Cholesterol (mg./100 ml.) | Weight Gain (Gms.) | Plasma Cholesterol (mg./100 ml.) | Weight Gain (Gms.) | Plasma Cholesterol (mg./100 ml.) | Weight Gain (Gms.) | Plasma Cholesterol (mg./100 ml.) | Weight Gain (Gms.) | Plasma Cholesterol (mg./100 ml.) | Weight Gain (Gms.) |
| None | 100 | 10.5 | 107 | 10.6 | 89 | 10.0 | 77 | 9.7 | 95 | 6.7 |
| 15% Mixed fat | 139 | 13.9 | 117 | 12.9 | 113 | 12.8 | 113 | 13.0 | 100 | 9.1 |
| 5% Hydrogenated coconut oil | 107 | 10.8 | 129 | 10.7 | 132 | 9.1 | 103 | 11.2 | 99 | 9.1 |
| 5% Corn oil | 114 | 12.4 | 120 | 12.6 | 114 | 11.5 | 95 | 12.5 | 80 | 6.3 |
| 5% Linseed oil | 84 | 11.2 | 99 | 11.7 | 91 | 12.0 | 87 | 10.7 | 92 | 9.9 |
| 5% Cod liver oil | 84 | 12.5 | 87 | 13.6 | 82 | 12.7 | 66 | 11.6 | 64 | 8.7 |

We claim:

1. A method of lowering the cholesterol content of mammalian plasma which comprises incorporating in the diet from 0.05 to 1.0% of lithocholic acid, based on the weight of said diet.

2. The method of claim 1 in which there is also included in the daily diet at least sufficient of a thyroid-active substance to be equivalent in activity to 0.01 mg. of thyroxine per kilogram of body weight per day.

3. The method of claim 2 in which the additional substance is iodinated casein.

4. The method of claim 2 in which the additional substance is thyroxine.

5. The method of claim 1 in which there is also included in the daily diet at least 0.5 mg. per kilogram of body weight of an in vivo cholesterol synthesis inhibitor.

6. The method of claim 5 in which the in vivo cholesterol synthesis inhibitor is 1-[p-($\beta$-diethylamino-ethoxy)phenyl]-1-(p-tolyl)-2-(p-chlorophenyl) ethanol.

7. A method of lowering the cholesterol content of mammalian plasma which comprises incorporating in the diet from 0.05 to 1.0% of hyodeoxycholic acid, based on the weight of said diet, and at least sufficient of a thyroid-active substance to be equivalent in activity to 0.01 mg. of thyroxine per kilogram of body weight per day.

8. The method of claim 7 in which the thyroid-active substance is iodinated casein.

9. The method of claim 7 in which the thyroid-active substance is thyroxine.

10. A method of lowering the cholesterol content of mammalian plasma which comprises incorporating in the diet from 0.05 to 1.0% of hyodeoxycholic acid, based on the weight of said diet, and sufficient of an in vivo cholesterol synthesis inhibitor to provide at least 0.5 mg. per kilogram of body weight per day.

11. The method of claim 10 in which the in vivo cholesterol synthesis inhibitor is 1-[p-($\beta$-diethyl-aminoethoxy)-phenyl]-1-(p-tolyl)-2-(p-chlorophenyl)ethanol.

References Cited in the file of this patent

UNITED STATES PATENTS

| | | |
|---|---|---|
| 2,687,436 | Novello | Aug. 24, 1954 |
| 2,914,562 | Allen | Nov. 24, 1959 |
| 2,925,364 | Bechtol | Feb. 16, 1960 |
| 2,980,585 | Stambul | Apr. 18, 1961 |

OTHER REFERENCES

Chilean Iodine Educational Bureau, "Iodine Pharmaceuticals," 1952, p. 1.

British Medical Journal, Mar. 1, 1958, p. 509.

Beher: Proc. Soc. Exptl. Biol. Med., vol. 103, No. 2, February 1960, pages 385-387.

Spain: Proc. Soc. Exptl. Biol. Med., vol. 196, No. 2, pp. 452-453, 1961.

Washington Daily News, April 19, 1962, p. 9.